(12) United States Patent
Edvardsson

(10) Patent No.: US 7,636,059 B1
(45) Date of Patent: Dec. 22, 2009

(54) IMPEDANCE MATCHED GUIDED WAVE RADAR LEVEL GAUGE SYSTEM

(75) Inventor: Olov Edvardsson, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 10 days.

(21) Appl. No.: 12/132,766

(22) Filed: Jun. 4, 2008

(51) Int. Cl.
*G01S 13/08* (2006.01)

(52) U.S. Cl. ..................................... 342/124

(58) Field of Classification Search ................. 342/124; 73/290 V, 290 R; 340/618
See application file for complete search history.

(56) References Cited

U.S. PATENT DOCUMENTS

| | | | | | |
|---|---|---|---|---|---|
| 6,401,532 | B2 * | 6/2002 | Lubbers | .................... | 73/290 R |
| 6,681,626 | B2 | 1/2004 | Fünfgeld | ..................... | 73/290 |
| 6,750,657 | B2 | 6/2004 | Griessbaum et al. | ........ | 324/642 |
| 6,834,546 | B2 * | 12/2004 | Edvardsson | ............... | 73/290 R |
| 7,525,476 | B1 * | 4/2009 | Delin et al. | ................. | 342/124 |
| 7,551,122 | B1 * | 6/2009 | Delin et al. | ................. | 342/124 |
| 2001/0047685 | A1 * | 12/2001 | Lubbers | .................... | 73/290 R |
| 2002/0124644 | A1 * | 9/2002 | Lubbers | .................... | 73/290 R |
| 2004/0173020 | A1 * | 9/2004 | Edvardsson | ............... | 73/290 V |
| 2008/0150789 | A1 * | 6/2008 | Jirskog et al. | ............... | 342/124 |
| 2009/0085794 | A1 * | 4/2009 | Edvardsson et al. | ......... | 342/124 |
| 2009/0121917 | A1 * | 5/2009 | Delin et al. | ................. | 342/124 |
| 2009/0146867 | A1 * | 6/2009 | Delin et al. | ................. | 342/124 |

* cited by examiner

*Primary Examiner*—Dan Pihulic
(74) *Attorney, Agent, or Firm*—Westman, Champlin & Kelly, P.A.

(57) ABSTRACT

A radar level gauge system, for determining a filling level of a product contained in a tank, the radar level gauge system comprising: a transceiver for generating, transmitting and receiving electromagnetic signals; a probe electrically connected to the transceiver at a probe-transceiver connection and arranged to extend towards and into the product contained in the tank, for guiding a transmitted signal from the transceiver towards a surface of the product, and for returning a surface echo signal resulting from reflection of the transmitted signal at the surface back towards the transceiver; an impedance matching device arranged to extend along a portion of the probe inside the tank, an extension of the impedance matching device, in a direction perpendicular to the probe, decreasing along the portion of the probe with increasing distance from the probe-transceiver connection, to thereby provide impedance matching between an impedance of the probe-transceiver connection and an impedance of the probe; and processing circuitry connected to the transceiver for determining the filling level based on the surface echo signal.

15 Claims, 8 Drawing Sheets

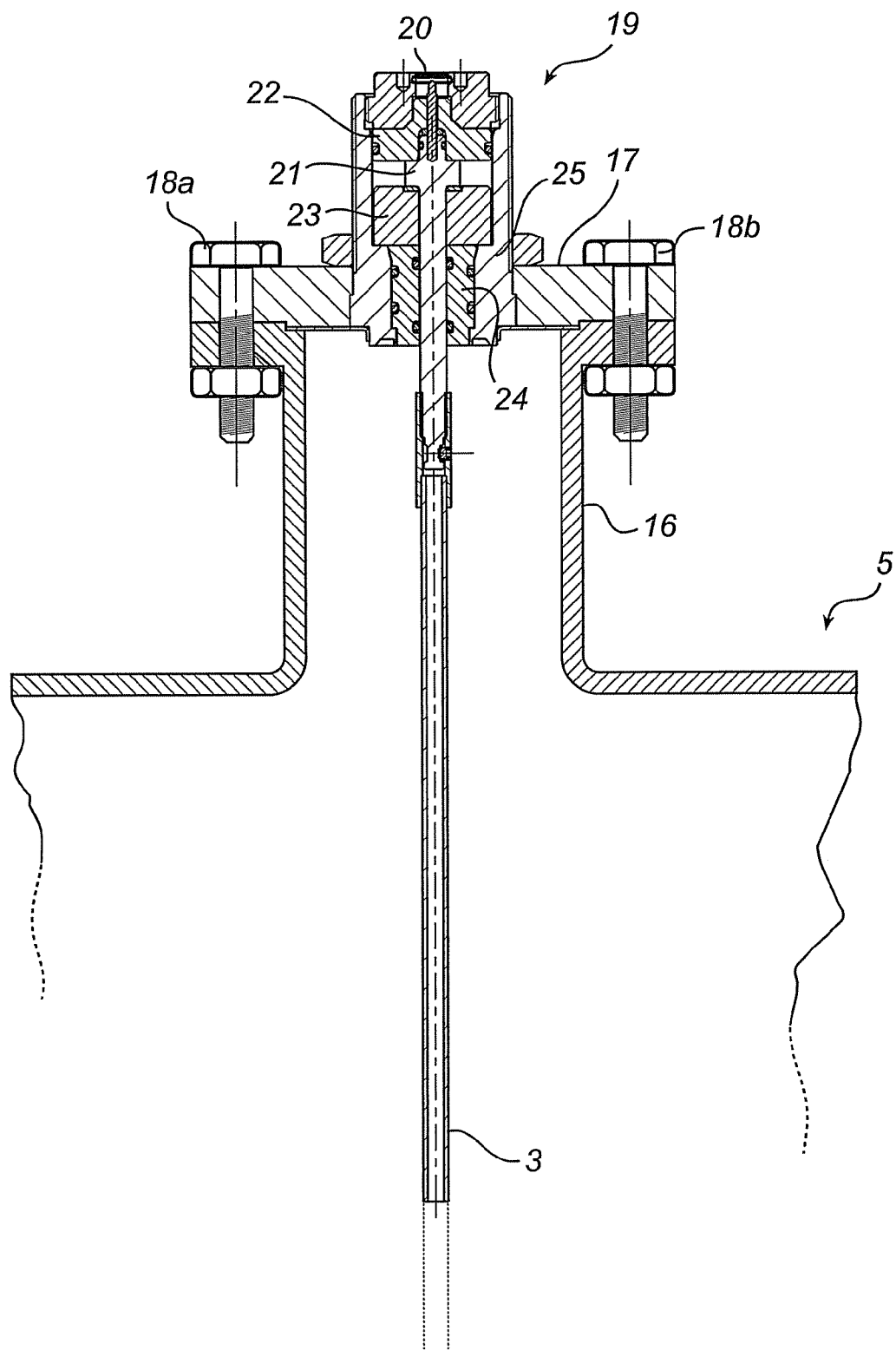
(Prior art) Fig. 2a

IMPEDANCE MATCHED GUIDED WAVE RADAR LEVEL GAUGE SYSTEM

TECHNICAL FIELD OF THE INVENTION

The present invention relates to a radar level gauge system of the GWR (Guided Wave Radar) type for determining a filling level of a product contained in a tank.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank. The probe may also be arranged in a measurement tube, a so-called chamber, that is connected to the outer wall of the tank and is in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the phase difference between a transmitted frequency-modulated signal and its reflection at the surface. The latter type of systems are generally referred to as being of the FMCW (Frequency Modulated Continuous Wave) type.

In any case, the propagated electromagnetic signal is typically not only reflected at the impedance transition constituted by the interface between atmosphere and surface, but at several other impedance transitions encountered by the signal. In the case of a GWR-system, one such impedance transition typically occurs at the connection between the transceiver and the probe. Generally, the transceiver is located outside the tank, and is connected to the probe via a feed-through going through a wall (typically the roof) of the tank.

Such a feed-through is typically formed by a coaxial line having the probe as its inner conductor, the tank wall or a connection piece that is attached to the tank as its outer conductor, and a dielectric member provided between the inner and outer conductors.

Because of its structure, the impedance of the feed-through is similar to that of a typical coaxial cable, that is, about 50Ω.

Since the impedance of the probe is typically considerably higher (about 200-300Ω for a twin line probe and about 300-350Ω for a single line probe) there will be a relatively large impedance transition at the interface between the feed-through and the probe.

As explained above, this impedance transition partly reflects the transmitted electromagnetic signal, giving rise to an echo signal which may be substantially stronger than the surface echo signal resulting from reflection of the transmitted signal at the surface of the product contained in the tank, especially when the product to be gauged is a material that yields a relatively weak echo signal. Examples of products yielding relatively weak echo signals are liquid natural gas (LNG), liquid petroleum gas (LPG), oil-based products, solids such as plastic pellets or grain etc.

This may in turn make it difficult to determine the filling level when the surface of the product is close to the ceiling of the tank, and may, furthermore, reduce the maximum measurable distance (minimum measurable filling level) because of the loss of signal that occurs at the impedance transition between the feed-through and the probe.

For instance, for the situation described above, with an impedance transition from the 50Ω impedance of the feed-through to the 300Ω impedance of a single line probe, only about 25% of the transmitted power is available to return to the transceiver after having passed the impedance transition going out and coming back. If the impedance transition is reduced from 1:6 to 1:2, 80% of the power returns. The difference in maximum measurable distance between these cases can be as much as 10 meters.

Various impedance matching arrangements have been proposed to smooth the impedance transition at the connection between the transceiver and the probe in order to reduce the amplitude of the echo signal resulting from reflection of the transmitted signal at the impedance transition.

U.S. Pat. No. 6,681,626 discloses one such impedance matching arrangement for a GWR-type radar level gauge system with a single line probe, according to which at least one electrical conductor is arranged to be spaced apart from the single line probe inside the tank.

Moreover, U.S. Pat. No. 6,750,657 discloses other impedance matching arrangements for a GWR-type radar level gauge system with a single line probe, in which the feed-through is modified to provide a gradually increasing impedance from the transceiver and towards the inside of the tank. According to one embodiment, the probe diameter decreases through the feed-through, and according to another embodiment, the probe is positioned off-center in the feed-through and a second metallic guiding element which is tapered is positioned alongside the probe to form a two-wire line with increasing impedance through the feed-through.

A drawback of the impedance matching arrangements disclosed in U.S. Pat. No. 6,681,626 or U.S. Pat. No. 6,750,657 is, however, that they all require a relatively large through-hole and therefore are not suitable for tank installations in which a small through-hole (sometimes as small as having a diameter of 1"-2" (2.5-5 cm) is used.

SUMMARY OF THE INVENTION

In view of the above-mentioned and other drawbacks of the prior art, a general object of the present invention is to provide an improved radar level gauge system, and in particular an impedance matched guided wave radar level gauge system suitable for installation in a tank with a relatively narrow existing through-hole in a wall thereof.

According to the present invention, these and other objects are achieved through a radar level gauge system, for determining a filling level of a product contained in a tank, the radar level gauge system comprising: a transceiver for generating, transmitting and receiving electromagnetic signals; a probe electrically connected to the transceiver at a probe-transceiver connection and arranged to extend towards and into the product contained in the tank, for guiding a transmitted signal from the transceiver towards a surface of the product, and for returning a surface echo signal resulting from reflection of the transmitted signal at the surface back towards the transceiver; an impedance matching device arranged to extend along a portion of the probe inside the tank, an extension of the impedance matching device, in a direction perpendicular to the probe, decreasing along the portion of the probe with increasing distance from the probe-transceiver connection, to thereby provide impedance matching between an impedance of the probe-transceiver connection and an impedance of the probe; and processing circuitry connected to the transceiver for determining the filling level based on the surface echo signal.

The tank may be any container or vessel capable of containing a product, and may be metallic, or partly or completely non-metallic, open, semi-open, or closed.

The "transceiver" may be one functional unit capable of transmitting and receiving electromagnetic signals, or may be a system comprising separate transmitter and receiver units.

The probe may be any structure suitable for guiding the electromagnetic signals transmitted by the transceiver. Examples of suitable waveguiding structures include single-line probes (such as so-called Goubau-type probes), twin-line probes, coaxial probes, etc. The waveguiding structure may be essentially rigid or flexible and may be made from metal, such as stainless steel, plastic, such as PTFE, or a combination thereof.

The "probe-transceiver connection" is the connection between the transceiver and the probe, and may typically be a coaxial connection having an impedance of about 50Ω.

The present invention is based on the realization that the impedance transition between the probe-transceiver connection and the probe can be made considerably less abrupt by arranging a tapered impedance matching device to extend along a portion of the probe inside the tank. The present inventor has further realized that such an impedance matching device can be made sufficiently compact, in terms of its extension in a direction perpendicular to the probe, that the impedance matching device (possibly pre-attached to the probe) can be inserted through even a relatively narrow through-hole provided in a wall (typically the roof) of the tank.

Hereby, an improved impedance matching, and hence an improved filling level determination in the near-zone (close to the tank ceiling) and an increased measurement range can be achieved also for applications where the through-hole in the tank wall is relatively small, such as having a diameter of only 1"-2".

To achieve a sufficiently smooth impedance transition, the impedance matching device may advantageously be arranged to extend along the portion of the probe inside the tank for a distance corresponding to at least a quarter of a wavelength at a center frequency of the transmitted signal.

An impedance matching device that extends a distance corresponding to at least a quarter of the wavelength of the transmitted signal can provide impedance matching that may be sufficient for many applications. To achieve a more wide-band impedance transition, the impedance transition device may advantageously extend a longer distance along the portion of the probe inside the tank, such as a distance corresponding to at least half the wavelength of the transmitted signal, or, for providing impedance matching across an even wider bandwidth, a distance corresponding to at least the wavelength of the transmitted signal.

It is important to note that the portion of the probe along which the impedance transition device is arranged can be used to determine the distance to the surface of the product even when the surface is within that portion. Accordingly, the provision of the impedance transition device along a portion of the probe inside the tank will not increase the so-called dead zone (the zone closest to the tank ceiling, that cannot be used for filling level determination), but rather decrease the dead zone.

Furthermore, the impedance matching device may be arranged to surround at least a portion of the probe, whereby a particularly compact arrangement can be achieved.

According to one embodiment of the present invention, the transceiver may be arranged outside the tank, and the probe may pass through a feed-through provided in a tank wall.

In this embodiment, the probe-transceiver connection may, for example, be arranged on the outside of the tank, or be comprised in the feed-through. In a typical configuration, the feed-through may comprise a dielectric member arranged between the probe and the tank wall. In this case, the feed-through, like the probe-transceiver connection, typically has an impedance of about 50Ω.

In this case, the impedance-matching device may advantageously extend along the probe from the feed-through towards the end of the probe inside the tank.

To achieve a smooth impedance transition, the impedance matching device should match the impedance of the probe-transceiver connection at the end thereof facing the probe-transceiver connection, and match the impedance of the probe at the end thereof facing away from the probe-transceiver connection.

In embodiments where the probe passes through a feed-through in the tank wall, this can be achieved by matching the lateral extension of the impedance matching device to the lateral extension of the dielectric in the feed-through at the feed-through side and to the lateral extension of the probe at the side of the impedance matching device facing away from the feed-through. The feed-through impedance depends on the materials comprised in the feed-through, and for a typical coaxial line type feed-through, the feed-through impedance is about 50Ω and the material sealing the feed-through is a dielectric material separating the probe and the metal inner wall of the opening in the tank. The suitable dimensioning of the lateral extension of the impedance matching device then depends upon its material and shape.

The extension perpendicular to the probe of the impedance matching device may decrease essentially continuously along the portion of the probe inside the tank, whereby a continuous impedance transition can be achieved.

Alternatively, the extension perpendicular to the probe of the impedance matching device may decrease stepwise along the portion of the probe inside the tank.

In the latter case, each step may advantageously have a length along the probe substantially corresponding to a quarter of a center wavelength of the transmitted signal.

Moreover, the impedance matching device may include a dielectric material, which may advantageously be a dielectric material having similar electrical properties as dielectric materials provided in the feed-through. The dielectric material of the impedance transition device may, at the end of the impedance matching device facing the feed-through, have essentially the same lateral dimensions as the dielectric in the feed-through and then taper to smaller lateral dimensions while extending along the portion of the probe inside the tank. In the case of a single line probe, the dielectric material may enclose the portion of the probe inside the tank, and may be essentially conically shaped with the base of the cone facing the feed-through.

Alternatively, the impedance matching device may comprise a conductive member. Through suitable dimensioning, such a conductive member can be made essentially electrically equivalent to a dielectric member, in respect of its microwave transmission properties.

Using one or several conductive members, the impedance matching device may, for example, be formed from sheet metal and can thus be made low-cost, and can easily be attached to the probe, for example by clamping.

To improve its electrical properties (mimicking dielectric), the metal plate may be provided with at least one cut-out. For example, one or several cut-outs may be provided as a perforation pattern in the interior of the conductive plate and/or one or several cut-outs may be provided at the periphery of the conductive plate.

The conductive member may, for example, have two "wings", symmetrically provided in relation to the probe. Alternatively, the conductive member may have additional symmetrically arranged "wings". Such a conductive member, may, for instance, be manufactured from more than one piece of sheet metal. With additional "wings", the maximum lateral extension of the impedance matching device can be reduced as compared to the case with only two "wings".

According to one embodiment of the radar level gauge system according to the present invention, the probe may be a single line probe and the impedance matching device may be essentially symmetrical with respect to the probe portion inside the tank.

As explained above, the impedance matching device may, for example, be provided as an essentially conical dielectric structure with its base facing the feed-through. In this case, the impedance matching device may be a continuation of the dielectric member provided in the feed-through, or may be a separate part positioned adjacent to the dielectric member provided in the feed-through.

Alternatively, the impedance matching device may be provided as a conductive member that is attached to the single line probe.

According to another embodiment of the radar level gauge system according to the present invention, the probe may be a twin line probe having first and second conductors, and the impedance matching device may be arranged around the first conductor along the portion of the probe inside the tank.

For example, the impedance matching device may be a dielectric member providing a smooth transition between the configuration of the feed-through and the twin line probe. When, as is generally the case, the first and second conductors are embedded in a dielectric in the feed-through, the impedance matching member may advantageously essentially correspond to the dielectric of the feed-through at the end of the impedance matching device facing the feed-through, and then taper towards the first conductor to provide the desired smooth transition from the feed-through impedance to the probe impedance of the twin line probe.

BRIEF DESCRIPTION OF THE DRAWINGS

These and other aspects of the present invention will now be described in more detail, with reference to the appended drawings showing a currently preferred embodiment of the invention, wherein:

FIG. 1b is a schematic illustration of the measurement electronics unit comprised in the radar level gauge system in FIG. 1a including a schematic feed-through;

FIG. 2a is a schematic cross-section view of a feed-through and a portion of a probe, comprised in an exemplary prior art radar level gauge system;

FIG. 4b is a diagram schematically illustrating the impedance transition from feed-through impedance to probe impedance for the arrangement in FIG. 4a;

FIG. 6b is a diagram schematically illustrating the impedance transition from feed-through impedance to probe impedance for the arrangement in FIG. 6a;

DETAILED DESCRIPTION OF A PREFERRED EMBODIMENT OF THE INVENTION

In the present detailed description, various embodiments of the radar level gauge system according to the present invention are mainly discussed with reference to a pulsed guided wave radar (GWR) level gauge system utilizing a rigid single line probe. It should be noted that this by no means limits the scope of the present invention, which is equally applicable to GWR-systems being equipped with various other kinds of probes, such as twin-line probes, coaxial probes, flexible probes, etc.

Furthermore, reference is mainly made to filling level determination through measuring the time between transmitted and reflected pulses. As is, however, evident to the person skilled in the relevant art, the teachings of the present invention are equally applicable to radar level gauge systems utilizing phase information for determining the filling level through, for example, frequency-modulated continuous wave (FMCW) measurements.

When pulses modulated on a carrier are used, phase information can also be utilized.

Figure 1A:
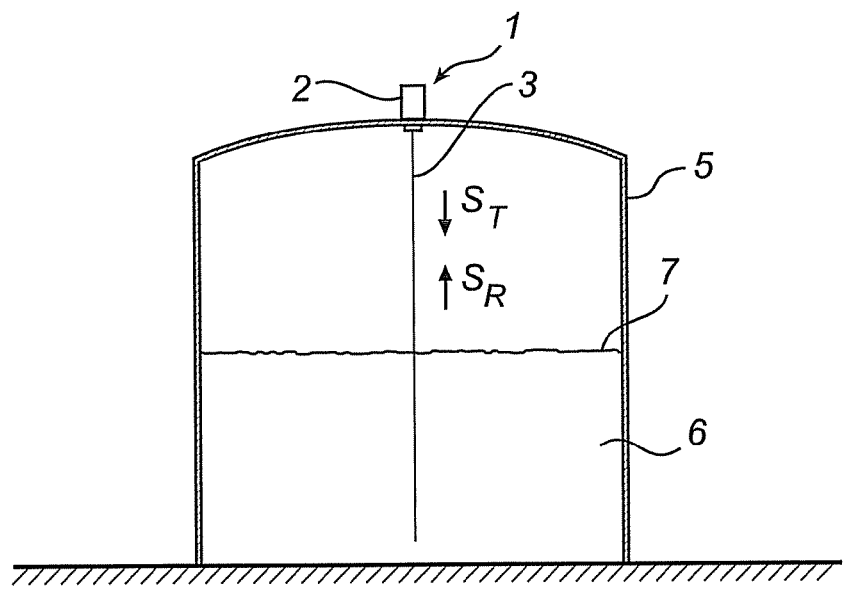
FIG. 1a schematically illustrates an exemplary radar level gauge system installed in a tank.

FIG. 1a schematically illustrates a radar level gauge system 1 according to an embodiment of the present invention, comprising a measurement electronics unit 2, and a probe 3. The radar level gauge system 1 is provided on a tank 5, which is partly filled with a product 6 to be gauged. By analyzing transmitted signals $S_T$ being guided by the probe 3 towards the surface 7 of the product 6, and reflected signals $S_R$ traveling back from the surface 7, the measurement electronics unit 2 can determine the distance between a reference position (such as the tank ceiling) and the surface 7 of the product 6, whereby the filling level can be deduced. It should be noted that, although a tank 5 containing a single product 6 is discussed herein, the distance to any material interface along the probe can be measured in a similar manner.

Figure 1B:
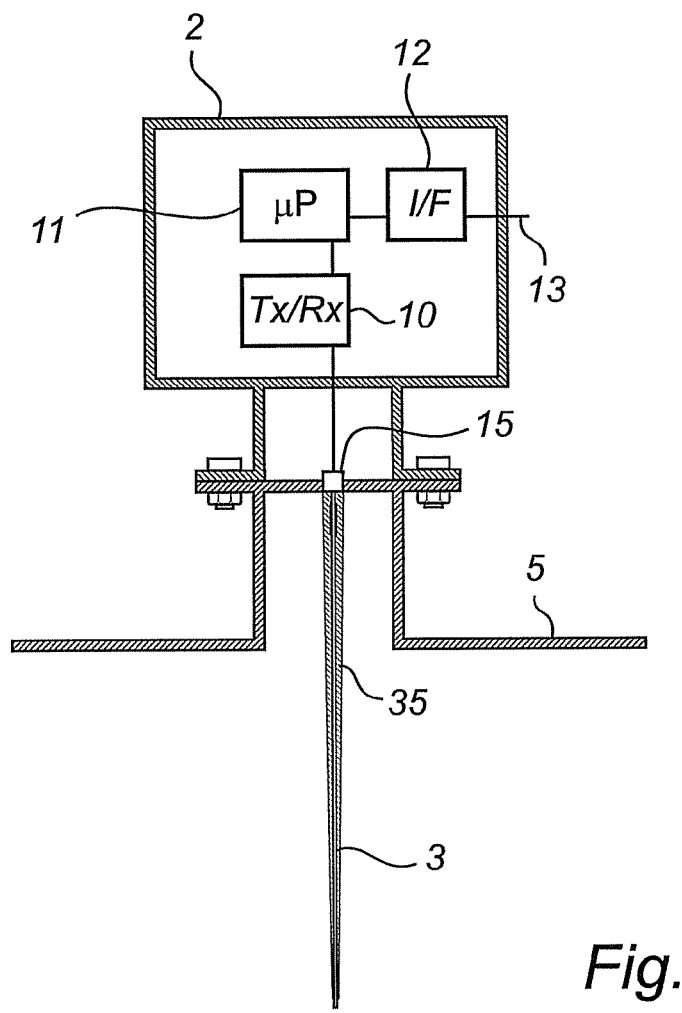

As is schematically illustrated in FIG. 1b, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5. The processing unit 11 is, furthermore, connectable to external communication lines 13 for analog and/or digital communication via an interface 12. Moreover, although not shown in FIG. 1b, the radar level gauge system 1 is typically connectable to an external power source, or may be powered through the external communication lines 13. Alternatively, the radar level gauge system 1 may be configured to communicate wirelessly.

Also indicated in FIG. 1b is an impedance matching device 35 which is provided to the probe 3 along a portion thereof inside the tank 5. The impedance matching device 35 extends from the feed-through 15 between the outside and the inside of the tank 5 and has, as is schematically indicated in FIG. 1b a lateral dimension that decreases along the portion of the probe 3 to which it is attached. Furthermore, to facilitate insertion into the tank 5, the maximum lateral dimension of the impedance matching device is smaller than the maximum lateral dimension of the through hole provided in the tank 5.

FIG. 2a is a schematic cross-section view of a feed-through and a portion of a probe, comprised in an exemplary prior art radar level gauge system.

In FIG. 2a, a single line probe 3 is shown mounted to a tank 5 having a nozzle 16 provided on the roof thereof. The probe 3 is mechanically connected to a flange 17 which is attached to the nozzle through bolts 18a-b. In the flange 17, a feed-through assembly 19 is provided for mechanically connecting the probe 3 to the tank 5 via the flange 17 and for electrically connecting the probe to the measurement electronics (not shown in FIG. 2) provided outside the tank 5. The feed-through assembly 19 also typically provides a gas-tight seal between the inside and the outside of the tank 5.

The connection to the measurement electronics (more specifically to the transceiver 10 comprised in the measurement electronics unit 2) is achieved through a coaxial connector 20 at the top of the feed-through assembly 19.

As is illustrated in FIG. 2a, the probe 3 is mechanically connected to the tank 5 by clamping a cylindrical protrusion 21 provided on the probe 3 between upper 22 and lower 23 dielectric members inside a metallic support member 25. Below the lower dielectric member 23 a further dielectric member 24 is provided. Accordingly, the microwave transmission line constituted by the probe 3, the dielectric members 22, 23, 24 and the metallic support member 25 typically has the electrical properties of a coaxial transmission line, including an impedance of about 50Ω. Below the feed-through assembly 19, inside the tank 5, the probe 3, in the present example, still extends through a coaxial arrangement with the tank atmosphere as the dielectric and the nozzle 16 as the outer conductor. However, because of the low dielectric constant of the tank atmosphere and the relatively long distance between the probe 3 and the wall of the nozzle 16, the electrical properties of the probe 3 below the feed-through assembly 19 can be approximated by those of a probe 3 extending through free space. Accordingly, the probe 3 typically has an impedance of about 300Ω below the feed-through assembly 19.

Figure 2B:
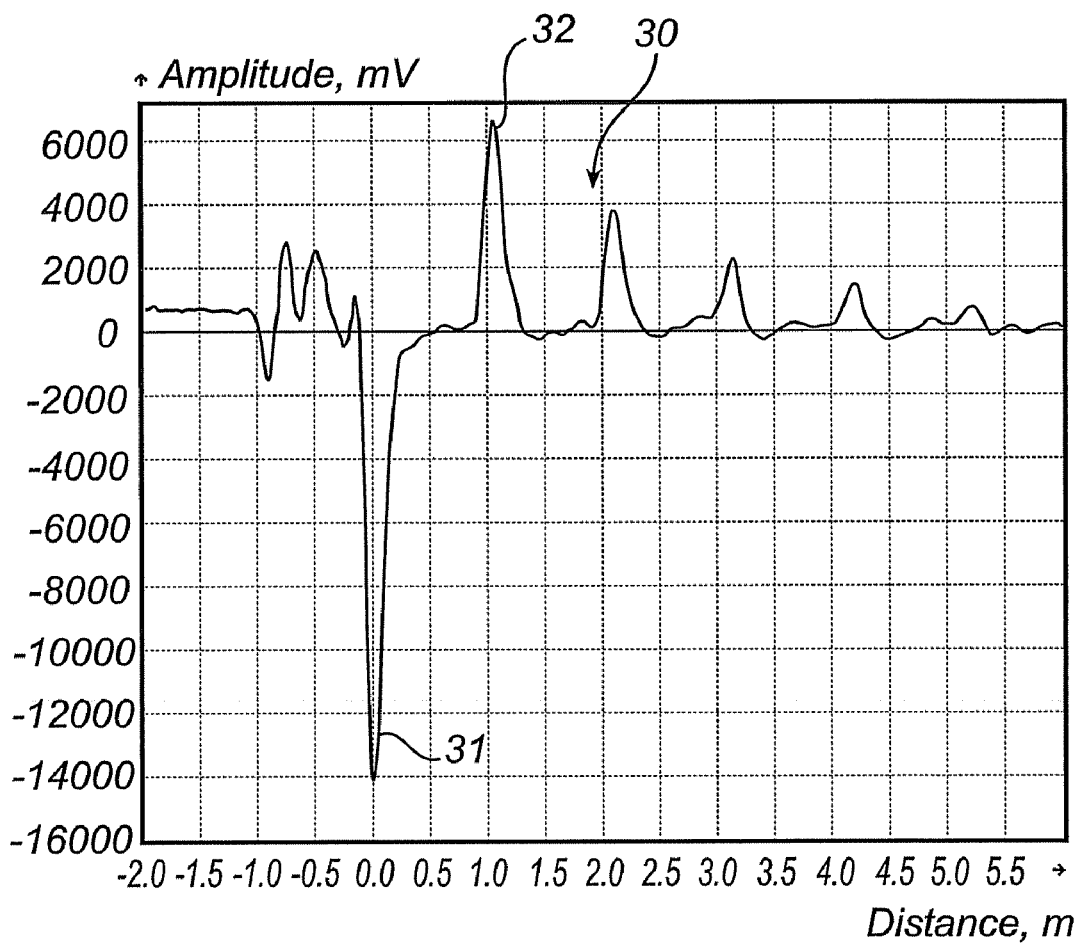
FIG. 2b schematically illustrates an exemplary echo profile for a pulsed radar level gauge system such as that in FIG. 2a without impedance matching of the connection between transceiver and probe.

The result of this large and sudden impedance transition is a very strong echo signal as is illustrated for a pulsed radar level gauge system in FIG. 2b.

FIG. 2b is a diagram schematically illustrating an exemplary echo profile 30 obtained using the radar level gauge configuration shown in FIG. 2a. As can be seen in FIG. 2b, the echo profile 30 includes a strong negative echo signal 31, which results from reflection of the transmitted electromagnetic signal at the impedance transition where the probe 3 leaves the feed-through assembly 19 as shown in FIG. 2a. The echo profile 30 also includes a surface echo signal 32 at a distance of about 1 meter from the impedance transition between feed-through assembly 19 and the probe 3. As is evident from FIG. 2b, the strong negative echo signal at the transition between feed-through and probe 3 is considerably stronger than the surface echo signal 32, which typically limits the ability to measure the distance to the surface 7 of the product 6 in the tank 5 in a zone near the roof of the tank 5.

Having now briefly described a known arrangement without any impedance matching at the interface between feed-through 19 and probe 3, an embodiment of the radar level gauge according to the invention, including an impedance matching device provided to the probe 3 inside the tank 5 will now be described with reference to FIGS. 3a-b.

Figure 3A:
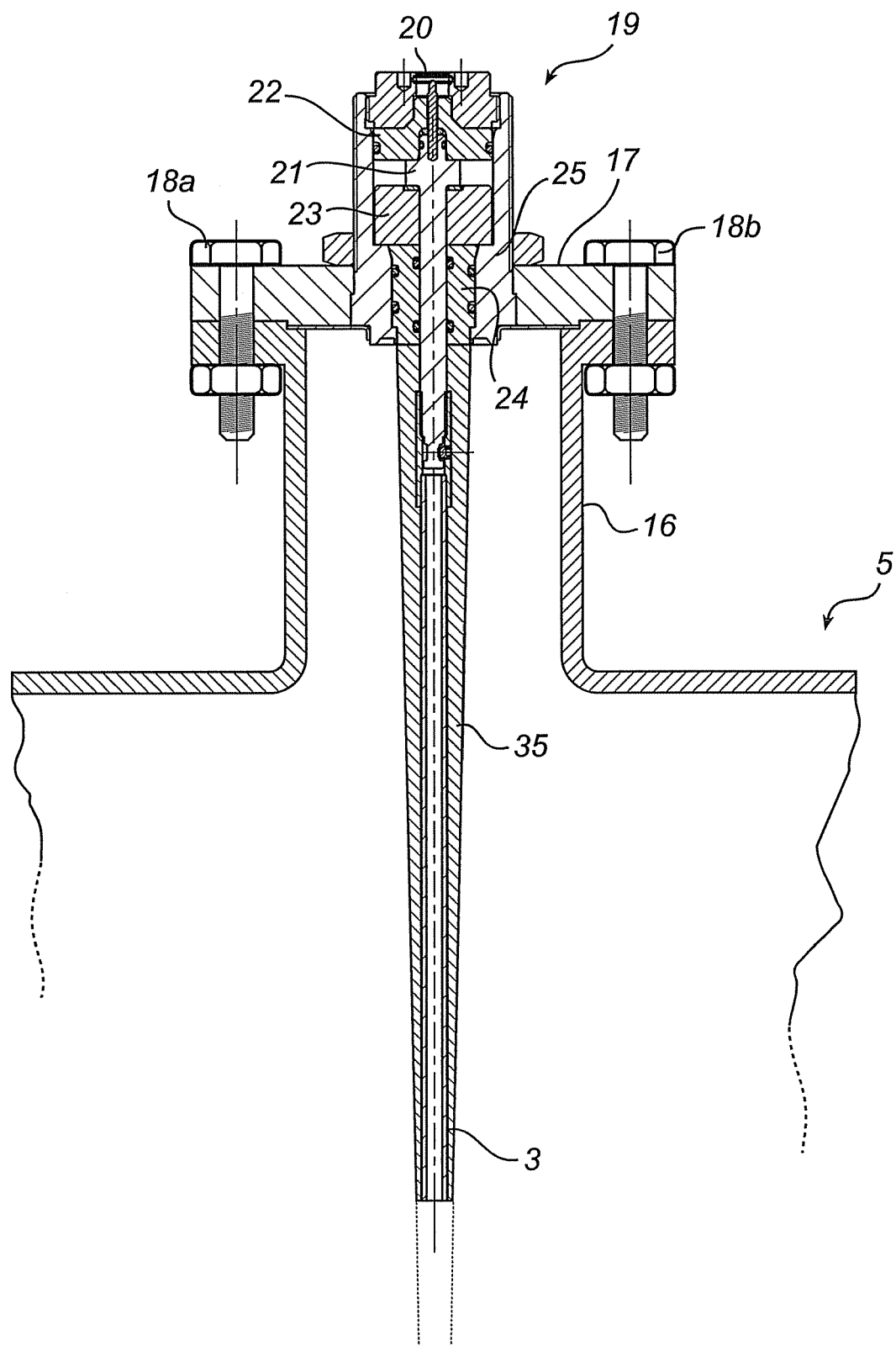
FIG. 3a is a schematic cross-section view of a feed-through and a portion of a probe provided with an impedance matching device, comprised in a radar level gauge system according to an embodiment of the present invention.

FIG. 3a is a schematic cross-section view of a feed-through and a portion of a probe provided with an impedance matching device, comprised in a radar level gauge system according to an embodiment of the present invention.

The partial radar level gauge system illustrated in FIG. 3a differs from that shown in FIG. 2a in that an impedance matching device, here in the form of a conically shaped dielectric member 35 is provided around the probe 3 inside the tank 5. This hollow dielectric cone 35 may, for example, be provided as a continuation of the previously mentioned dielectric member 24 inside the feed-through assembly 19, or may alternatively be provided as a separate dielectric member. Through its decreasing lateral extension along the probe 3, the impedance matching device 35 provides a wideband impedance matching between the impedance in the feed-through assembly 19 and the impedance of the probe 3 in free space, which considerably reduces the reflection at the impedance transition. Since the echo signal obtained at the interface between the feed-through 19 and the probe 3 is advantageously used as a reference marker from which the distance to the surface 7 of the product 6 can be determined, it may be desirable to keep a rather sharp, but small impedance transition where the feed-through assembly 19 ends. This may be achieved through proper design of the impedance matching device 35, for example by providing a notch in the device or spacing it apart slightly from the dielectric member 24 in the feed-through assembly 19.

Figure 3B:
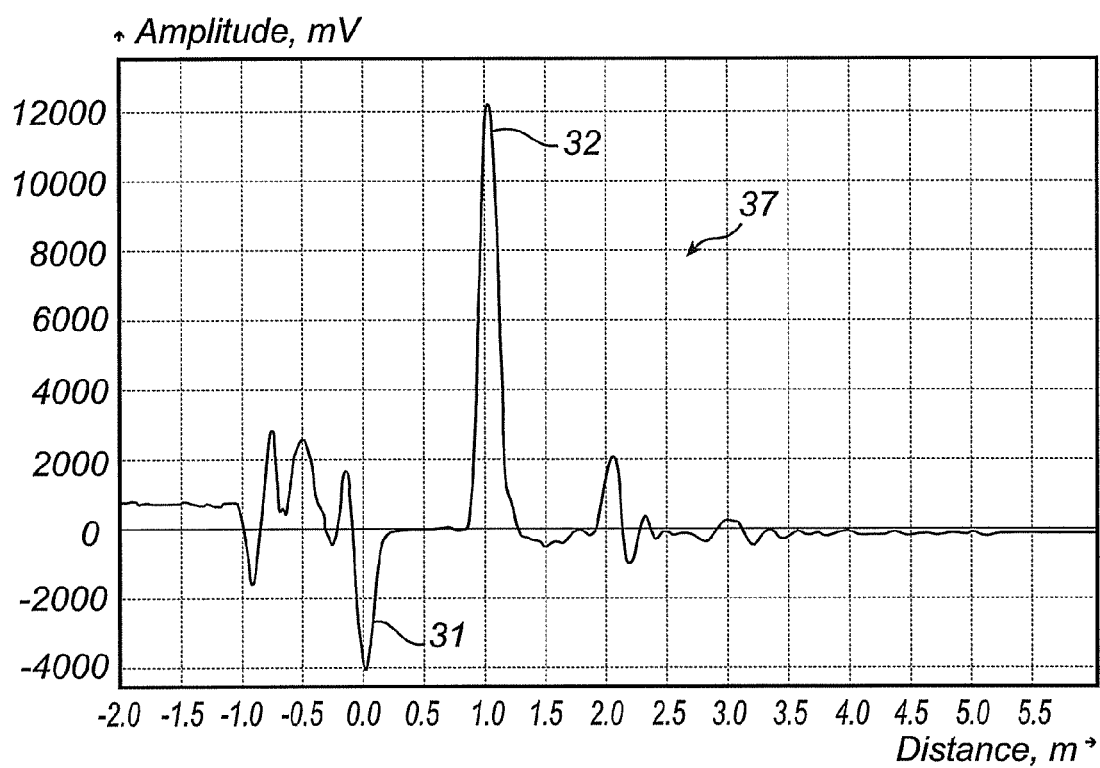
FIG. 3b schematically illustrates an exemplary echo profile for a pulsed radar level gauge system such as that in FIG. 3a with impedance matching of the connection between transceiver and probe.

Turning now to FIG. 3b, which shows an exemplary echo profile 37 obtained using the arrangement of FIG. 3a, it can be seen that the provision of the impedance matching device 35 has considerably improved the relation between the reference echo signal 31 occurring at the interface between the feed-through assembly 19 and the probe 3 and the surface echo signal 32. Studying the echo profile 37 in FIG. 3b, it is also evident that any disturbance from the reference echo signal 31 in the near-zone (close to the top of the tank) has been considerably reduced. As is also clear from a comparison between FIGS. 2b and 3b, the signal loss at the impedance transition between feed-through 19 and probe 3 has been greatly reduced, which leads to a considerably stronger surface echo signal 32 and an increased range of the radar level gauge system.

As described above in connection with FIGS. 3a-b, the impedance matching device 35 provided to the probe 3 can considerably reduce the abruptness of the impedance transition between the coaxial connection constituted by the feed-through 19 and the probe 3 in free space inside the tank 5. Furthermore, by suitably configuring the impedance matching device, the impedance transition can be tailored to suit the requirements of the particular application.

Below, an exemplary impedance transition will be described with reference to FIGS. 4a-b that schematically illustrate a single line probe 3 with an impedance matching device 35 and a representative impedance transition from the impedance $Z_0$ of the feed-through assembly 19 to the impedance $Z_1$ of the single-line probe 3 in free space.

Figure 4A:
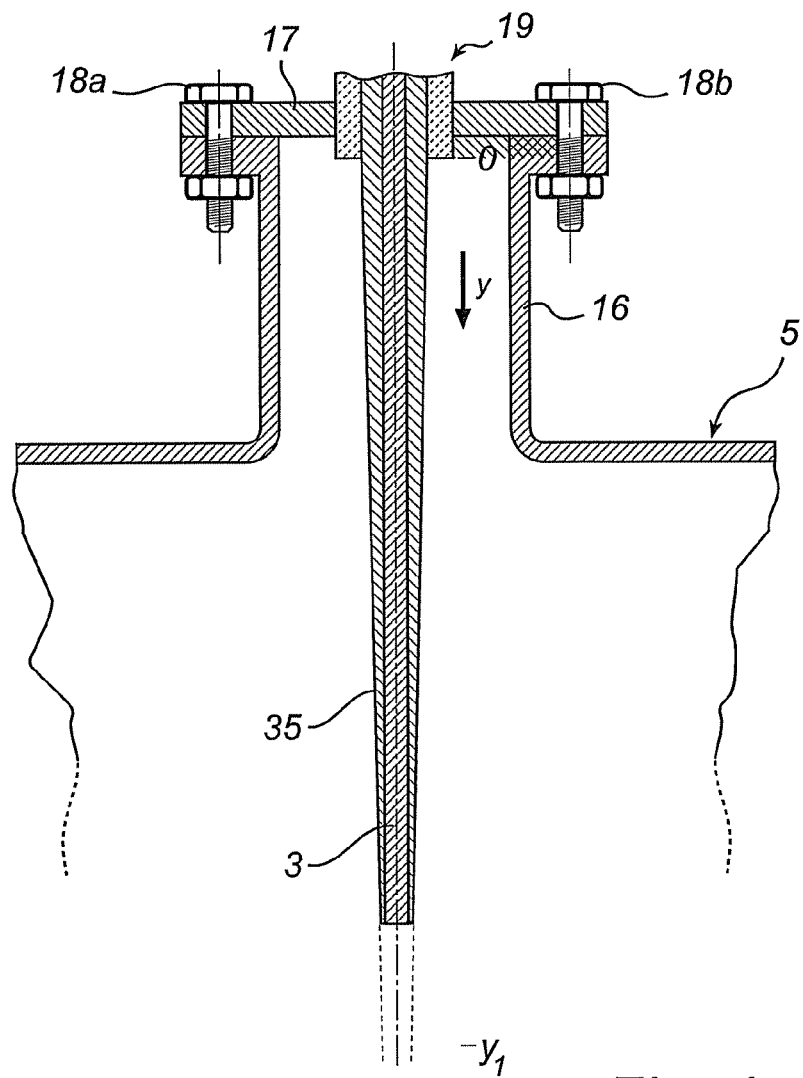
FIG. 4a schematically illustrates a single line probe and impedance matching device comprised in a radar level gauge system according to an embodiment of the present invention.

FIG. 4a shows a probe 3 connected to a nozzle 16 of a tank 5 via a feed-through 19 provided in a flange 17, but in considerably less detail than in FIG. 3a. Referring to FIG. 4a, the impedance matching device 35 starts where the feed-through 19 ends at y=0, and extends along the probe 3 towards the interior of the tank 5 until $y=y_1$ where the probe 3 extends in free space towards the product 6 contained in the tank 5.

Figure 4B:
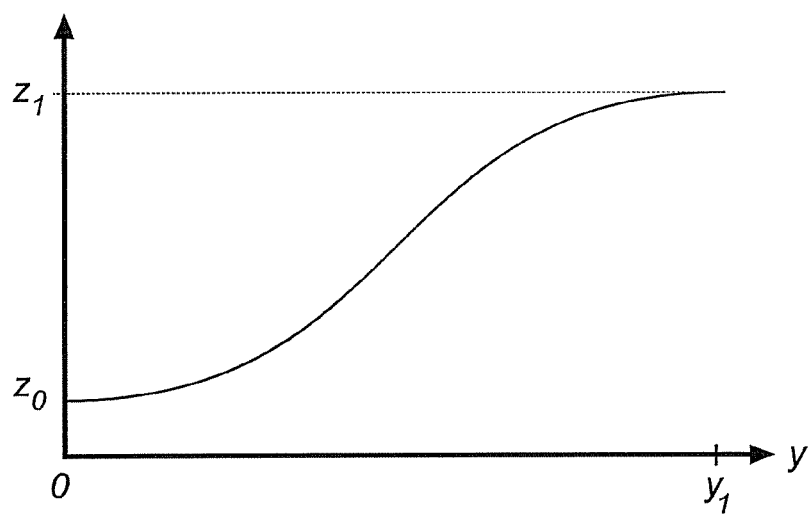

As is schematically illustrated in FIG. 4b, the impedance at y=0 corresponds to the feed-through impedance, denoted $Z_0$, and the impedance at $y_1$ corresponds to the probe impedance, denoted $Z_1$. As can be seen in FIG. 4b, the transition from $Z_0$ to $Z_1$ is smooth, resulting in a considerably reduced reflection and accompanying loss of transmitted signal at the transition from $Z_0$ to $Z_1$ as compared to a situation without impedance matching.

Although the impedance matching device 35 has so far only be described as a hollow conically shaped dielectric member, it is evident to the person skilled in the art that several other configurations are possible and may be advantageous depending on application. A number of exemplary configurations will be described below with reference to FIGS. 5a-d.

Figure 5A:
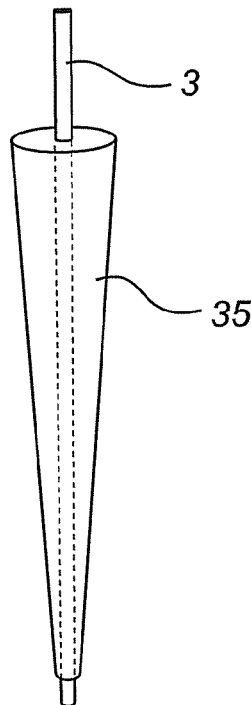
FIGS. 5a-d schematically illustrate different exemplary impedance matching devices included in radar level gauge systems according to embodiments of the present invention.

FIG. 5a schematically illustrates the above-described configuration with a hollow conically shaped dielectric member 35 provided around a single line probe 3.

Figure 5B:
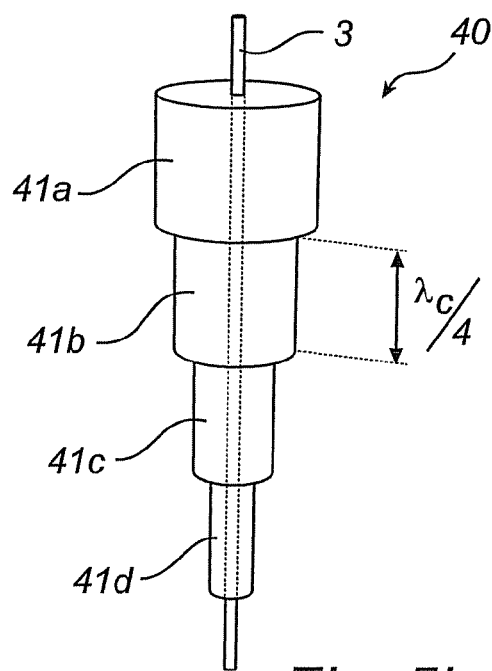

FIG. 5b illustrates an alternative dielectric impedance matching device 40, comprising four cylindrical segments 41a-d with decreasing diameter towards the free end of the probe 3. Each cylindrical segment 41a-d may advantageously have a length of about a quarter of a wavelength of the center frequency of the signal to be transmitted by the transceiver 10 and guided along the probe 3. Hereby, a wideband impedance transition can be achieved. Providing a longer impedance matching device with additional cylindrical segments, an even larger bandwidth can be achieved.

For a pulsed radar level gauge system of the guided wave radar (GWR) type, pulses having a pulse width of about 1 ns may typically be used. A 1 ns pulse generally corresponds to a frequency range of about 0.1 GHz to 1 GHz. It is expected that an impedance matching device having about 6 to 8 quarter wavelength segments (with respect to the center frequency) will result in a good impedance matching over this entire range.

As an alternative to providing the impedance matching device as a dielectric member, it can instead be provided as one or several suitably shaped conductive members, such as metal sheets, which, depending on application may be an attractive alternative whereby a truly low-cost impedance matching can be achieved.

Figure 5C:
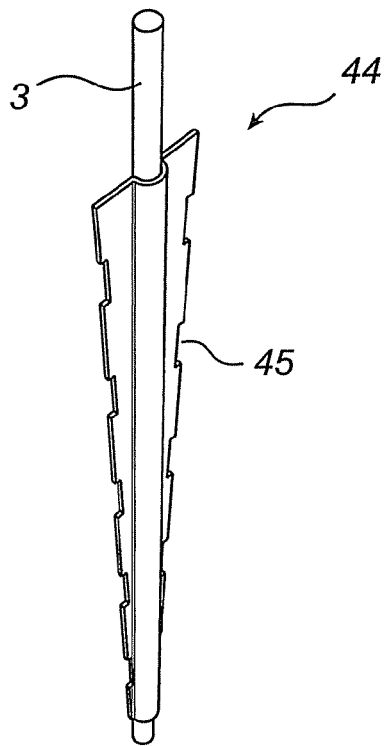

In FIG. 5c a first exemplary embodiment of such a conductive impedance matching device 44 is shown attached to a single line probe 3. The impedance matching device 44 in FIG. 5c has a number of cut-outs 45 (only one is here indicated with a reference numeral) provided thereto to increase the longitudinal inductance of the device 44. Through the configuration schematically shown in FIG. 5c, the electrical behavior of the metal sheet impedance matching device 44 can be made similar to that of the dielectric cone 35 in FIG. 5a in the relevant frequency range (GHz).

Figure 5D:
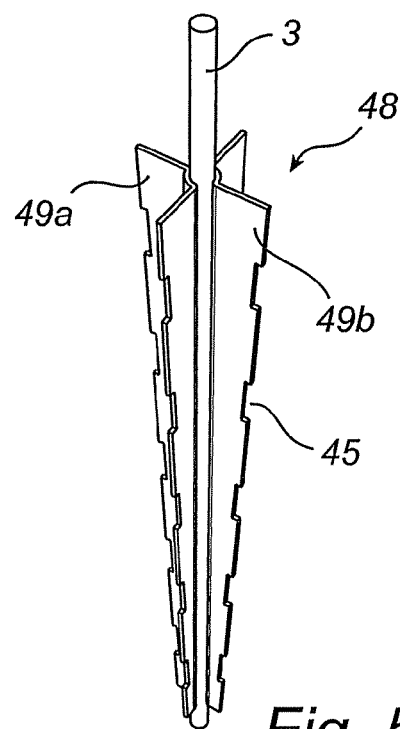

In FIG. 5d, an alternative electrically conductive impedance matching device 48 is provided, comprising two metal sheets 49a-b that are attached to the probe 3 in such a way that an impedance matching device with four "wings" are formed. Hereby, a smaller maximum lateral dimension can be achieved as compared to the impedance matching device 44 in FIG. 5c, which enables insertion through a narrower tank nozzle. Similarly to the impedance matching device 44 in FIG. 5c, the impedance matching device 48 in FIG. 5d is also provided with cut-outs 45.

It should be noted that FIGS. 5a-d only illustrate a few representative exemplary embodiments of the impedance matching device comprised in the radar level gauge system according to the present invention, and that the skilled person could easily consider various variations of these embodiments without exercising any inventive skill.

So far, the impedance matching provided through the radar level gauge system according to embodiments of the present invention has only been illustrated for one exemplary type of probe, namely a single line probe 3. However, the invention is equally applicable to radar level gauge systems having other types of probes. One example of such an alternative probe configuration will be briefly described below with reference to FIGS. 6a-b.

Figure 6A:
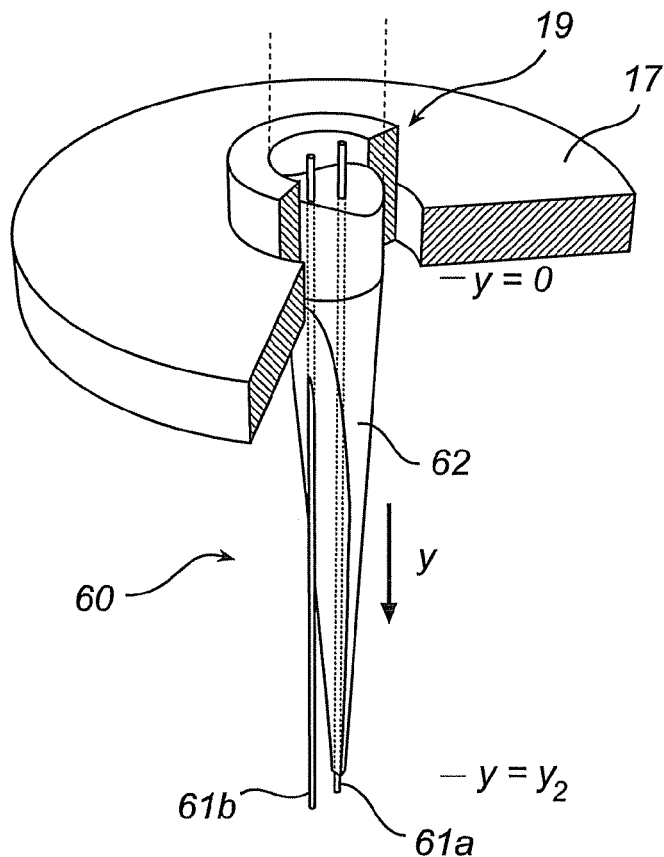
FIG. 6a schematically illustrates a twin line probe and impedance matching device comprised in a radar level gauge system according to an embodiment of the present invention.

FIG. 6a shows a twin line probe 60 comprising a first 61a and a second 61b conductor, connected to a nozzle 16 of a tank 5 via a feed-through 19 provided in a flange 17 (compare with the single line case illustrated in FIG. 4a). Referring to FIG. 6a, the impedance matching device 62 starts where the feed-through 19 ends at y=0, and extends along the probe 60 towards the interior of the tank 5 until $y=y_2$ where the probe 60 extends in free space towards the product 6 contained in the tank 5.

Figure 6B:
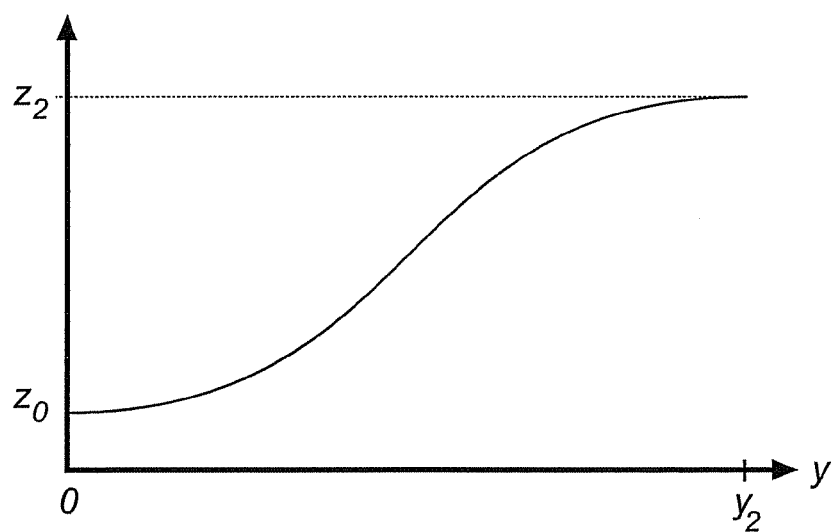

As is schematically illustrated in FIG. 6b, the impedance at y=0 corresponds to the feed-through impedance, denoted $Z_0$, and the impedance at $y_2$ corresponds to the probe impedance, denoted $Z_2$. As can be seen in FIG. 6b, the transition from $Z_0$ to $Z_2$ is smooth, resulting in a considerably reduced reflection and accompanying loss of transmitted signal at the transition from $Z_0$ to $Z_2$ as compared to a situation without impedance matching.

What is claimed is:

1. A radar level gauge system, for determining a filling level of a product contained in a tank, said radar level gauge system comprising:

a transceiver for generating, transmitting and receiving electromagnetic signals;

a probe electrically connected to said transceiver at a probe-transceiver connection and arranged to extend towards and into said product contained in the tank, for guiding a transmitted signal from said transceiver towards a surface of said product, and for returning a surface echo signal resulting from reflection of said transmitted signal at said surface back towards said transceiver;

an impedance matching device arranged to extend along a portion of the probe inside the tank, an extension of said impedance matching device, in a direction perpendicular to said probe, decreasing along said portion of the probe with increasing distance from the probe-transceiver connection, to thereby provide impedance matching between an impedance of said probe-transceiver connection and an impedance of said probe; and processing circuitry connected to said transceiver for determining said filling level based on said surface echo signal.

2. The radar level gauge system according to claim 1, wherein said impedance matching device is arranged to extend along said portion of the probe inside the tank for a distance corresponding to at least a quarter of a wavelength at a center frequency of the transmitted signal.

3. The radar level gauge system according to claim 1, wherein said impedance matching device is arranged to surround at least a portion of said probe.

4. The radar level gauge system according to claim 1, wherein said extension of the impedance matching device, in said direction perpendicular to said probe, decreases substantially continuously along said portion of the probe inside the tank.

5. The radar level gauge system according to claim 1, wherein said extension of said impedance matching device, in said direction perpendicular to said probe, decreases stepwise along said portion of the probe inside the tank.

6. The radar level gauge system according to claim 5, wherein each step has a length along the probe substantially corresponding to a quarter of a wavelength at a center frequency of the transmitted signal.

7. The radar level gauge system according to claim 1, wherein said impedance matching device comprises a dielectric material.

8. The radar level gauge system according to claim 7, wherein said impedance matching device is made of a dielectric material.

9. The radar level gauge system according to claim 7, wherein said impedance matching device is an essentially conically shaped member at least partly surrounding said portion of the probe.

10. The radar level gauge system according to claim 1, wherein said impedance matching device comprises a conductive member.

11. The radar level gauge system according to claim 10, wherein said conductive member is provided as a metal plate having a plurality of cut-outs formed therein.

12. The radar level gauge system according to claim 1, wherein said probe is a single line probe and said impedance matching device is essentially symmetrical with respect to said probe portion inside the tank.

13. The radar level gauge system according to claim 1, wherein said probe is a twin line probe having first and second conductors, and said impedance matching device is arranged around said first conductor along said portion of the probe inside the tank.

14. The radar level gauge system according to claim 1, wherein said transceiver is arranged outside said tank, and said probe passes through a tank wall through a feed-through.

15. The radar level gauge system according to claim 14, wherein said feed-through comprises a dielectric member arranged between said probe and said tank wall.

* * * * *

UNITED STATES PATENT AND TRADEMARK OFFICE
CERTIFICATE OF CORRECTION

PATENT NO. : 7,636,059 B1
APPLICATION NO. : 12/132766
DATED : December 22, 2009
INVENTOR(S) : Edvardsson It is certified that error appears in the above-identified patent and that said Letters Patent is hereby corrected as shown below:

Title Page, item (73) "Gothenburg (SE)" should be changed to --Goteborg (SE)--

Signed and Sealed this

Sixteenth Day of March, 2010

David J. Kappos
*Director of the United States Patent and Trademark Office*